United States Patent
Brooks et al.

(10) Patent No.: US 9,002,855 B2
(45) Date of Patent: Apr. 7, 2015

(54) TAG VALUATION WITHIN A COLLABORATIVE TAGGING SYSTEM

(75) Inventors: David A. Brooks, Providence, RI (US); Andrew L. Schirmer, Andover, MA (US); Edmund B. Stanton, Beverly, MA (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/855,544

(22) Filed: Sep. 14, 2007

(65) Prior Publication Data

US 2009/0077025 A1   Mar. 19, 2009

(51) Int. Cl.
  G06F 7/00       (2006.01)
  G06F 17/30      (2006.01)
  G06F 13/14      (2006.01)

(52) U.S. Cl.
  CPC .............................. *G06F 17/30867* (2013.01)

(58) Field of Classification Search
  USPC .................. 707/3, 101–104.1, 1, 7, E17.014, 707/E17.074, E17.084, E17.98, 4, 748, 707/752–754, 999.001; 706/16
  See application file for complete search history.

(56) References Cited

U.S. PATENT DOCUMENTS

| | | | |
|---|---|---|---|
| 6,859,807 B1 | 2/2005 | Knight et al. | |
| 7,668,821 B1 * | 2/2010 | Donsbach et al. | 707/765 |
| 7,685,200 B2 * | 3/2010 | Gunawardena et al. | 707/748 |
| 2006/0242135 A1 * | 10/2006 | Weare | 707/4 |
| 2006/0294134 A1 | 12/2006 | Berkhim et al. | |
| 2007/0043583 A1 | 2/2007 | Davulcu et al. | |
| 2007/0043688 A1 | 2/2007 | Kountz et al. | |
| 2007/0043745 A1 | 2/2007 | Rojer | |
| 2008/0040301 A1 * | 2/2008 | Sadagopan et al. | 706/16 |

FOREIGN PATENT DOCUMENTS

| | | |
|---|---|---|
| WO | WO2006099407 | 7/2006 |
| WO | WO2006072027 | 9/2006 |

OTHER PUBLICATIONS

Golder et al., "The Structure of Collaborative Tagging Systems" Journal of Information Science, 32(2), pp. 198-208 (2006).
Feinberg, "Social Bookmarking in the Enterprise", Social Computing, vol. 3, No. 9 (Nov. 2005).

* cited by examiner

*Primary Examiner* — Usmaan Saeed
*Assistant Examiner* — Cecile Vo
(74) *Attorney, Agent, or Firm* — Cuenot, Forsythe & Kim, LLC

(57) ABSTRACT

A method of assessing the value of tags in a collaborative tagging system can include monitoring user interaction with each of a plurality of tags and/or artifacts associated with tags, wherein each of the plurality of tags has been previously associated with at least one artifact of the collaborative tagging system. For each of the plurality of tags, a measure of value for the tag can be determined according to user interaction with the tag. A list comprising at least one tag and an indication of the measure of value of the tag can be output.

9 Claims, 3 Drawing Sheets

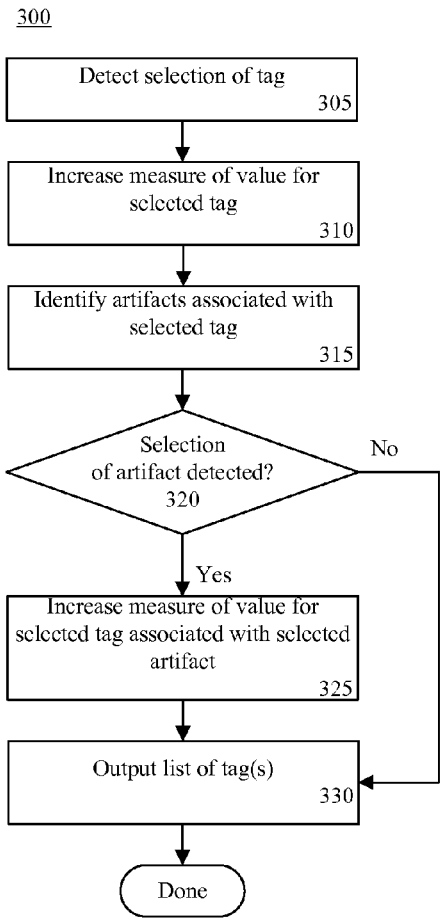
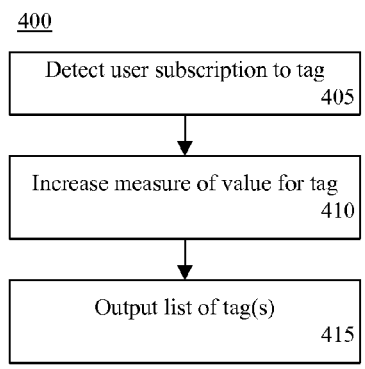
FIG. 4
FIG. 3

US 9,002,855 B2

TAG VALUATION WITHIN A COLLABORATIVE TAGGING SYSTEM

BACKGROUND OF THE INVENTION

A social network generally refers to a group of individuals related to one another based upon some shared value, idea, need, financial exchange, family relation, etc. Social networks have existed in various forms in everyday life. With the continued development of the Internet, social networks have migrated into the online world. One example of a social network is an Internet-based bulletin board or discussion forum. Such sites allow the posting of comments and/or files relating to a subject of common interest to the member users, e.g., the members of the "social network" or community.

Online social networks allow users to post personal profiles with personal data, shared interests, pictures, music, video, and a variety of other user relevant information. To help organize, categorize, and navigate these large expanses of data, some systems have come to use collaborative tagging. In general, "collaborative tagging" refers to a system in which users associate keywords, known as "tags," with various objects or references to objects, e.g., data. Each tag can be user-defined and is usually descriptive of some aspect of the object(s) to which the tag is associated. A tag can be viewed as a form of metadata in that each tag provides information about the data to which the tag is associated.

Unlike typical taxonomies used for large digital libraries, the tags used to describe content in a collaborative tagging system are not defined by a rigid classification system. Rather, users may freely create tags and freely associate those tags with objects or references to objects, depending upon the particular type of collaborative tagging system. This results in a "flatter" structure for classifying data. By comparison, a taxonomy is hierarchical in nature. Navigating from one item of information to another within a taxonomy requires traversal of the hierarchy. While collaborative tagging systems provide a level of openness that is welcome and useful, such systems frequently have a very large number of descriptive tags that a user must navigate to find information of interest.

BRIEF SUMMARY OF THE INVENTION

The present invention relates to assessing value of tags in a collaborative tagging system. One embodiment of the present invention can include a method of assessing value of tags in a collaborative tagging system. The method can include, monitoring user interaction with each of a plurality of tags, wherein each of the plurality of tags has been previously associated with at least one artifact of the collaborative tagging system. The method can further include, for each of the plurality of tags, determining a measure of value for the tag according to user interaction with the tag and outputting a list of at least one tag and an indication of the measure of value of the tag. Additionally, monitoring can include searching for a tag via the collaborative tagging system and identifying search results comprising at least one tag. Determining can include increasing the measure of value for each tag identified by the search results.

Another embodiment of the present invention can include a method of assessing value of tags in a collaborative tagging system. The method can include, monitoring user interaction with each of a plurality of artifacts, wherein each of the plurality of artifacts has been previously associated with at least one tag of the collaborative tagging system. One or more tags associated with one or more of the plurality of artifacts can be identified. The method further can include, for each tag, determining a measure of value for the tag according to user interaction with the artifact associated with the tag and outputting a list of at least one tag and an indication of the measure of value of the tag. Additionally, monitoring can include searching for an artifact, identifying search results comprising at least one artifact, and identifying at least one tag associated with the artifact included in the search results. Determining can include increasing the measure of value of the tag associated with the artifact identified by the search results.

Yet another embodiment of the present invention can include a computer program product including a computer-usable medium having computer-usable code that, when executed, causes a machine to perform the various steps and/or functions described herein.

BRIEF DESCRIPTION OF THE SEVERAL VIEWS OF THE DRAWINGS

FIG. 3 is a third flow chart illustrating a method of assessing value of tags in a collaborative tagging system in accordance with another embodiment of the present invention.

FIG. 4 is a fourth flow chart illustrating a method of assessing value of tags in a collaborative tagging system in accordance with another embodiment of the present invention.

DETAILED DESCRIPTION OF THE INVENTION

Figure 1:
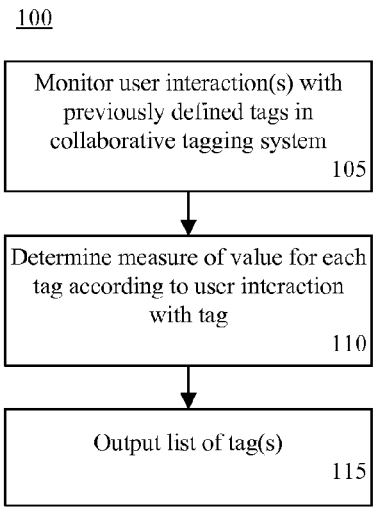
FIG. 1 is a first flow chart illustrating a method of assessing value of tags in a collaborative tagging system in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart(s) and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart(s) and/or block diagram block or blocks.

The embodiments disclosed herein relate to assessing value of tags in a collaborative tagging system. Within a collaborative tagging system, referred to herein as a "tagging system," users can freely create and associate tags with artifacts. An "artifact," as used herein, can refer to any form of digital information, for example, an electronic document, an object, a file, a portion of text, video, audio, a picture, a universal resource identifier (URI) or universal resource locator (URL) (hereafter "bookmark"), or the like. Another type of artifact can be a user or a user profile. In some aspects, users may be viewed differently than artifacts in that users generally act upon artifacts. Because a user or user profile generally is a collection of information pertaining to a person, tags may be associated with that user or user profile. In that respect, users or user profiles may be considered another variety of artifact with which tags may be associated.

As a tagging system increases in size, a large and unwieldy number of tags may result. The tagging system can also generate "meta-noise" as the lack of a controlled vocabulary may lead to esoteric, little used tags. Conventional tagging systems have relied upon the frequency of tag assignment to determine user interest in tags, and therefore, artifacts associated with those tags. In other words, conventional tagging systems have observed the number of times, e.g., the frequency, that a particular tag has been assigned or associated with an artifact as a proxy for user interest in that tag or artifact. This manner of tag valuation, however, leads to situations in which a tag has a high frequency of assignment, but is not used often by users of the system to locate information.

Consider the case where a tag of "IBM" is associated with many artifacts within an IBM employee-based tagging system. The tag "IBM" will seemingly have a high level of importance as many artifacts likely will be associated with the tag. For example, a ranking of tags in terms of frequency of assignment may result in the tag "IBM" having a high ranking. In terms of locating information, however, the high frequency of assignment may be counter-productive. That is, users are less likely to use the tag "IBM" to locate information due to the pervasiveness of the tag within the system. While seemingly important, the tag "IBM" is less important in terms of finding information of interest to users of the tagging system.

Rather than rely upon frequency of assignment of a tag, the embodiments disclosed herein relate to observing user interactions and/or gestures relating to existing tags within the tagging system. That is, the embodiments disclosed herein detect user interactions with tags that have already been created and assigned to artifacts to determine user interest or value in the tags as well as artifacts associated with those tags. User interaction with previously defined tags indicates actual user interest in that the interactions reflect use of a tag in locating information, e.g., artifacts, of interest. In illustration, the tag "IBM," when ranked according to user interaction(s), may have a much lower ranking. For example, "clicking" on a tag may indicate interest in an artifact associated with that tag, whether a user or other type of artifact. Accordingly, the value of the "clicked" tag can be increased responsive to the "clicking" action.

One variety of tagging system can store and/or maintain objects directly. For example, actual digital files can be stored or maintained within the system. Within such a tagging system, tags may be associated or applied directly to the objects. Another variety of tagging system does not store or maintain objects, but rather references, e.g., bookmarks, to the objects. Within such a tagging system, tags can be associated or applied to the reference to the object rather than to the object itself. It should be appreciated that the embodiments disclosed herein can be applied and used with both varieties of systems. In this regard, a "tag that is associated with an artifact" may refer to the case where a tag is directly associated with the artifact or to the case where the tagging system stores a bookmark to the artifact and the tag is actually associated with the bookmark.

FIG. 1 is a first flow chart illustrating a method 100 of assessing value of tags in a tagging system in accordance with one embodiment of the present invention. The method 100 can be implemented by a tagging system configured as described herein. In general, the method 100 illustrates a technique for using user interactions with tags already defined and associated with artifacts within the tagging system to determine a measure of value, e.g., an indication of user interest, for the tags. The method 100 can begin in a state in which a plurality of artifacts are being tracked and have been tagged by users of the tagging system.

Accordingly, in step 105, the tagging system can monitor user interaction with tags within the tagging system. As used herein, user interaction can refer to a user gesture or input that serves as a proxy for user interest in a tag. Examples of user interactions can include, but are not limited to, searching for a tag, selecting or exercising a tag, and/or subscribing to a tag. The tagging system can monitor and detect, e.g., count, the occurrence of the different types of user interactions with respect to existing tags, e.g., tags already defined and associated with artifacts in the tagging system.

It should be appreciated that when user interactions with tags are detected, the tagging system may record information about the user interaction. The recorded information can include, for example, time stamp information specifying a date and/or time of the interaction, the identity of the user that implemented the user interaction, or the like.

In step 110, the tagging system can determine a measure of value for one or more of the tags in the tagging system according to the user interactions. In one embodiment the tagging system can determine a measure of value for one or more tags based upon the frequency, e.g., a count, of user interactions or particular user interactions. The measure of value for each tag in the tagging system may or may not be directly proportional to the detected user interaction for that tag. In one embodiment, calculating a measure of value can be limited to include only those user interactions or types of user-interactions, e.g., searching, selecting, and/or subscribing, that may occur over a specified period of time, e.g., based upon the time stamp information. For example, user-interactions can be monitored over the course of a day, a week, a month, a year, etc.

In step 115, a list of one or more tags of the tagging system can be output. As used herein, "outputting" can include, but is not limited to, writing to a file, writing to a user display or other output device, playing audible notifications, sending or transmitting to another system, exporting, or the like. The list of tags further can specify or indicate a measure of value for each tag on the list. In one embodiment, the list can be ordered according to the measures of value. In another embodiment, the measures of values can be explicitly stated on the list. Still other methods for specifying tag values can be implemented such as presenting a tag cloud indicating a relative measure of value for each tag in the tag cloud.

Figure 2:
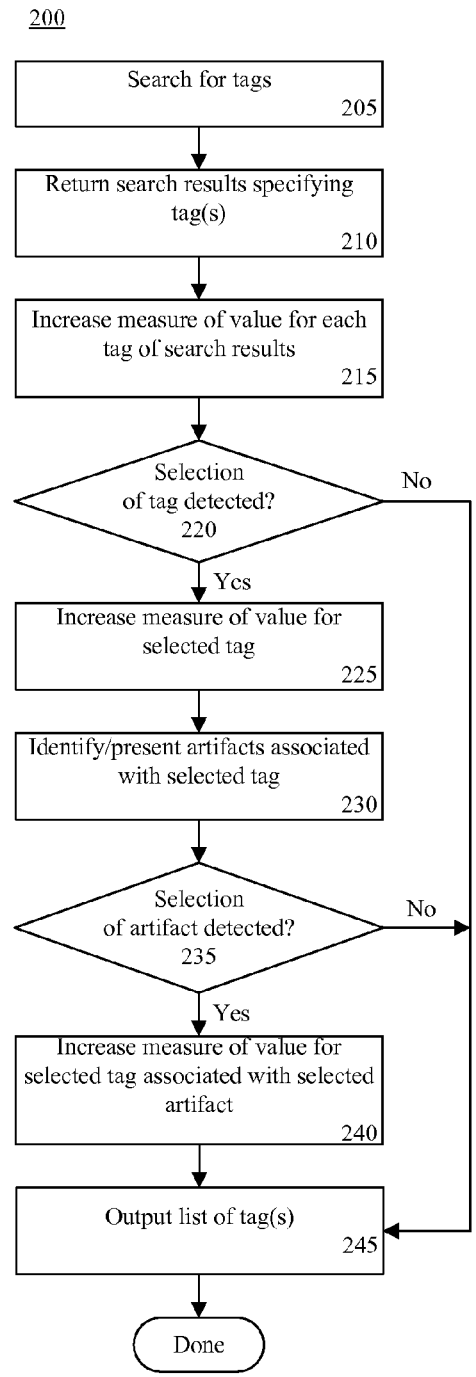
FIG. 2 is a second flow chart illustrating a method of assessing value of tags in a collaborative tagging system in accordance with another embodiment of the present invention.

FIG. 2 is a second flow chart illustrating a method 200 of assessing value of tags in a tagging system in accordance with another embodiment of the present invention. The method 200 illustrates an embodiment in which user interaction with tags includes searching for a tag or tags. The term "search" or "searching," as used herein, can refer to a search for an exact match, a fuzzy search, a keyword search, a Boolean search, a proximity search, or the like.

The method 200 can begin in step 205, where a search for one or more tags can be performed. The search, for example, can be implemented by the tagging system responsive to a user input or other user request for a search, whether for a particular tag, a keyword, etc. For example, a user may initiate a search for tags including the word "compile." In step 210, search results including one or more tags can be returned by the tagging system. These results can be presented, e.g., visually displayed, to the user.

In step 215, a measure of value maintained by the tagging system for each tag can be adjusted for each tag returned as a search result. More particularly, the measure of value for each tag specified by the search results can be incremented. In this case, the search indicates user interest in the tags returned as search results. Accordingly, the measure of value for each such tag can be incremented.

In one embodiment, incrementing the measure of value of a tag can include adding a predetermined number to the measure of value. For example, the measure of value can be incremented by one each time an adjustment is made as described herein. In another embodiment, measures of values can be incremented by multiplying the measure of value by some factor greater than one. In yet another embodiment, the detection of a different type of user interaction with a tag may result in incrementing the measure of value of the tag by a different amount for each respective user interaction, or just a further adjustment of the measure of value by a same amount.

In step 220, the tagging system can determine whether a selection of a tag specified by the tag results has been detected. As used herein, "selecting" a tag can refer to exercising the tag. More particularly, "selecting" a tag, or exercising a tag, can refer to a user input that results in the presentation of any artifacts associated with that tag. For example, a user may select a tag such as "compile C" by clicking on the tag using some sort of pointing device, e.g., a mouse. Responsive to the selection of the tag, those artifacts, whether files, bookmarks, or the like, that have been associated with the tag "compile C" can be presented. If a tag is selected, the method can proceed to step 225. If not, the method can end.

In step 225, the measure of value of the selected tag can be adjusted, e.g., incremented as described herein. In step 230, any artifacts associated with the selected tag can be identified. As noted, responsive to the selection of the tag, such artifacts can be presented to the user. For example, a list of artifacts including users, electronic documents, bookmarks, pictures, or the like, each being associated with the selected tag, can be presented. It should be appreciated that the search, and thus search results, can be limited to one particular type of artifact, e.g., bookmarks or users. Thus, in step 235, the tagging system can determine whether a user selection of an artifact associated with the selected tag has been detected. If so, the method can continue to step 240. If not, the method can end.

In step 240, responsive to a user input selecting an artifact associated with the selected tag, the measure of value of the selected tag can be further adjusted or increased. Selection of an artifact, like selection of a tag, can mean exercising, executing, or launching the artifact. For example, viewing the properties of an artifact may not indicate user interest and, as such, is not considered selecting the artifact. By comparison, launching a file, e.g., opening a file, likely indicates user interest in that artifact and is considered selecting the artifact. In another embodiment, the measure of value for each tag associated with the selected artifact can be incremented. In this manner, each tag associated with the selected artifact can be considered related, and therefore, of interest. In step 245, a list of one or more tags of the tagging system and a measure, or indication, of value for each tag on the list can be output.

FIG. 3 is a third flow chart illustrating a method 300 of assessing value of tags in a tagging system in accordance with another embodiment of the present invention. The method 300 illustrates an embodiment in which user interactions include user inputs that select a tag, as previously noted. The method 300 illustrates an example where a user selects a tag directly, e.g., without first performing a search. Accordingly, it may be the case that the tagging system has presented a list of one or more tags to a user. Such tags may be a listing of popular tags that is continually displayed within the system, a list of tags associated with another user, etc.

In step 305, the tagging system can detect a selection of a tag via a user input received by the tagging system. In step 310, the measure of value of the selected tag can be adjusted, e.g., incremented, as described herein. In step 315, any artifacts associated with the selected tag can be identified. In step 320, the tagging system can determine whether a user selection of an artifact associated with the selected tag has been detected. If so, the method can continue to step 325. If not, the method can end.

In step 325, responsive to a user input selecting an artifact associated with the selected tag, the measure of value of the selected tag can be further adjusted or increased. In step 330, a list of one or more tags of the tagging system can be output. As noted, the list can specify an indication of the measure of value for each tag on the list.

FIG. 4 is a fourth flow chart illustrating a method 400 of assessing value of tags in a tagging system in accordance with another embodiment of the present invention. The method 400 illustrates an embodiment in which user interactions include subscriptions to tags. More particularly, within the tagging system, a user may have an interest in a particular tag. Accordingly, that user can "subscribe" to the tag. The subscription can provide the subscribing user with information about the tag as the tag evolves within the tagging system. For example, the subscribing user can receive information and update messages regarding changes in the measure of value of the tag or changes in the artifacts with which the tag is associated. The act of subscribing to a tag can indicate higher interest in that tag.

Accordingly, in step 405, a user subscription to a tag of the tagging system can be detected. In step 410, the measure of value of the tag to which the user has subscribed can be adjusted, e.g., increased. In step 415, a list of tags and a measure or indication of value of each tag on the list can be output. It should be appreciated that incrementing measures of value for tags according to subscriptions, or the number of subscriptions to the tag within the tagging system, can be used independently or in combination with the other techniques described with reference to FIGS. 1-3.

It should be appreciated that while valuation of tags is illustrated on a case by case basis, the monitoring of user interactions with tags can be performed on a system-wide level. Accordingly, the measure of value for a tag can be reflective of interactions with that tag by all users. For example, a measure of value for a tag can reflect zero, one or more or all of the following interactions: searches for the tag, selections of the tag, subscriptions to the tag, and/or selections of artifacts associated with the tag. Further, each of the various techniques disclosed herein can be used independently or in any combination.

Figure 5:
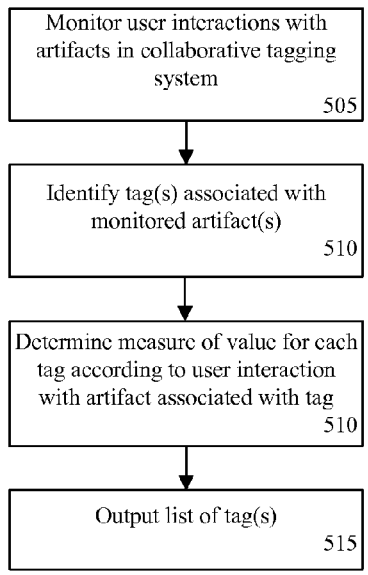
FIG. 5 is a fifth flow chart illustrating a method of assessing value of tags in a collaborative tagging system in accordance with another embodiment of the present invention.

FIG. 5 is a fifth flow chart illustrating a method 500 of assessing value of tags in a tagging system in accordance with another embodiment of the present invention. The method 500 illustrates an embodiment in which user interactions with artifacts are monitored. Through observed user interaction with artifacts, the measure of value for tags associated with the observed artifacts can be adjusted. The method 500 exploits the notion that user interaction with an artifact demonstrates user interest in a tag associated with the artifact.

The method 500 can begin in step 505, where user interactions with artifacts of the tagging system can be observed. For example, the frequency of such interactions can be observed and recorded. User interaction with an artifact can mean, for example, searching for an artifact, selecting an artifact, or subscribing to an artifact, e.g., a user or user profile. As noted, selecting an artifact can include executing or launching that artifact as opposed to putting focus or highlighting the artifact. In step 510, one or more tags associated with the observed artifacts can be identified. For example, each tag associated with an observed artifact can be identified.

In step 515, a measure of value for one or more tags of the tagging system can be determined according to observed user interaction with the artifacts associated with each tag. For example, the measure of value of a tag can correspond to, or be proportional to, the frequency of interaction by users with the artifacts associated with that tag. Like observing user interaction with tags, the user interactions with artifacts can be time stamped and measured or observed over different time periods as may be desired, e.g., a day, a week, or a month. In step 520, a list of tags and the measure or indication of value for each tag on the list can be output.

Figure 6:
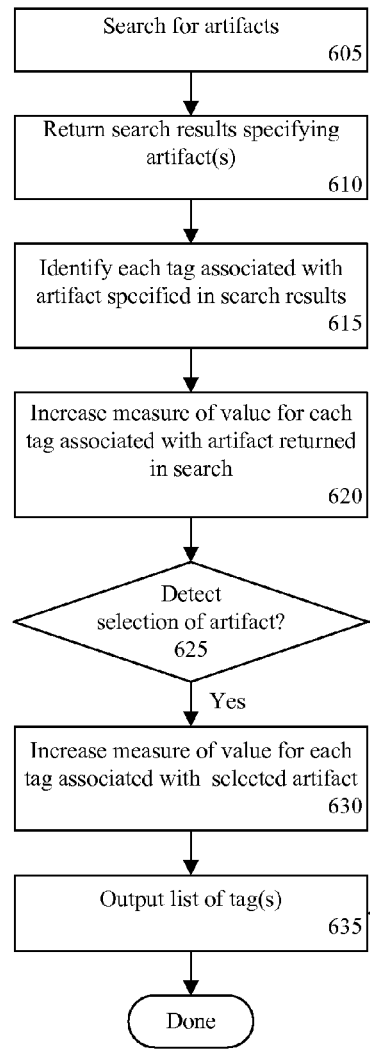
FIG. 6 is a sixth flow chart illustrating a method of assessing value of tags in a collaborative tagging system in accordance with another embodiment of the present invention.

FIG. 6 is a sixth flow chart illustrating a method 600 of assessing value of tags in a tagging system in accordance with another embodiment of the present invention. The method 600 illustrates an embodiment in which user interaction includes searching for artifact(s), as opposed to first searching for a tag. In this example, searching for a tag can be an indication of user interest in those tags associated with the artifacts returned or located by the search. Accordingly, the method 600 can begin in step 605 where a search for an artifact is initiated or performed responsive to a user request to do so. In step 610, search results specifying one or more artifacts identified by the search can be presented.

In step 615, the tagging system can identify each tag that has been associated with an artifact returned as part of the search results. In step 620, the tagging system can increment the measure of value of each tag identified in step 615. In step 625, the tagging system can determine whether a selection of an artifact has been detected. If so, the method can proceed to step 630. If not, the method can end.

In step 630, the measure of value of each tag that is associated with the selected artifact can be incremented. In step 635, a list specifying one or more tags and associated measures of value for each tag on the list can be output.

Figure 7:
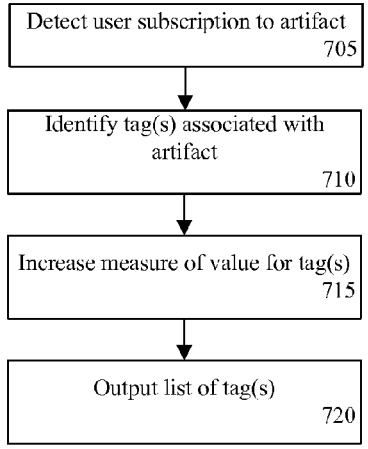
FIG. 7 is a seventh flow chart illustrating a method of assessing value of tags in a collaborative tagging system in accordance with another embodiment of the present invention.

FIG. 7 is a seventh flow chart illustrating a method 700 of assessing value of tags in a tagging system in accordance with another embodiment of the present invention. The method 700 illustrates the case in which user interactions include subscriptions to artifacts, whether users, files, bookmarks, or the like. For example, a user, e.g., user A, can subscribe to another user, or profile of that user, e.g., user B. As such, the subscribing user can be notified of changes in the information associated with that user, including tags and the measures of value of such tags.

Accordingly, in step 705, the tagging system can detect a user subscription to an artifact. In step 710, responsive to detecting the subscription, any tags associated with the artifact to which the user has subscribed can be identified. In step 715, the measure of value of each such tag can be incremented. In step 720, a list of one or more tags and associated measures or indication(s) of value for such tags can be output.

As noted, the various techniques disclosed herein for adjusting tag values can be implemented system wide, can be implemented individually, or in any combination. In one embodiment each of the various techniques discussed herein can be used cooperatively, e.g., used within a measure of value calculation with user specified or designated weightings. In some cases, the lack of user interaction with an artifact or a tag over a given time period may result in the reduction of the measure of value of the tag itself or the tag associated with the artifact(s). In such cases, for example, the measure of value of an unused tag can be decremented after a predetermined period of non-use.

Generally, relationships among tags can be determined by the association of tags to artifacts. While several of the exemplary embodiments disclosed herein relate to searching or interacting with tags and/or artifacts in real-time for tag valuation, it should be appreciated that relationships among tags can be used to value tags in other ways. For example, another embodiment of the present invention can determine a measure of value for tags according to tag co-occurrence.

For example, consider that any time a given tag, e.g., tag A, is associated with an artifact, a likelihood of another tag, e.g., tag B, also being associated with the same artifact can be determined. This likelihood can be used to adjust the value tag B. For example, in one embodiment, the likelihood can be multiplied with the value of tag A or used within another function involving the value of tag A to determine an adjustment value that can be added to the value of tag B. In any case, information relating to tag co-occurrence, or other relationships among tags, can be maintained and made available for tag valuation without first implementing a search.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer implemented method of assessing value of tags in a collaborative tagging system, the method comprising:

monitoring, via a processor, user interaction with each of a plurality of tags, wherein each of the plurality of tags has been previously associated with at least one artifact of the collaborative tagging system;

detecting a selection of at least one of the tags;

detecting a selection of at least one artifact associated with the selected tag;

determining a measure of value for the selected tag and each other tag associated with the artifact, wherein determining the measure of value comprises increasing the measure of value of the selected tag and the other tags associated with the artifact in response to the selection of the artifact; and outputting a list comprising at least the selected tag and an indication of the measure of value of the selected tag;

wherein the monitoring user interaction comprises subscribing a user of the collaborative tagging system to a designated tag to provide to the user information about the designated tag as the tag evolves within the collaborative tagging system, wherein determining a measure of value further comprises calculating the measure of value according to a frequency of user interaction with the tag.

2. The method of claim 1, wherein the selected tag is identified by search results comprising at least the selected tag.

3. The method of claim 1, wherein the list further comprises each other tag associated with the artifact.

4. A computer implemented method of assessing value of tags in a collaborative tagging system, the method comprising:
- monitoring, via a processor, user interaction with each of a plurality of artifacts, wherein each of the plurality of artifacts has been previously associated with at least one tag of the collaborative tagging system;
- detecting a user selection of at least one of the artifacts;
- identifying each of a plurality of tags associated with the selected artifact;
- for each of the plurality of tags associated with the selected artifact, determining a measure of value for the tag according to user interaction with the artifact associated with the tag; and
- outputting a list of at least one of the plurality of tags and an indication of the measure of value of the tag;
- wherein the monitoring user interaction subscribing a user of the collaborative tagging system to a designated artifact to provide to the user information about the designated artifact as the tags associated with the designated artifact evolves within the collaborative tagging system, wherein
- determining a measure of value further comprises calculating the measure of value according to a frequency of user interaction with each of the plurality of artifacts.

5. The method of claim 4, wherein monitoring user interaction further comprises detecting a selection of the artifact, wherein determining the measure of value for the tag comprises increasing the measure of value for the tag associated with the selected artifact.

6. The method of claim 4, wherein the list comprises each of the plurality of tags associated with the artifact.

7. A computer program product comprising:
- computer-readable device having computer-usable program code stored thereon that, when executed by a computer, assesses value of tags in a collaborative tagging system, the computer program product including:
- computer-usable program code that monitors user interaction with each of a plurality of tags, wherein each of the plurality of tags has been previously associated with at least one artifact of the collaborative tagging system;
- computer-usable program code that detects a selection of at least one of the tags;
- computer-usable program code that detects a selection of at least one artifact associated with the selected tag;
- computer-usable program code that determines a measure of value for the selected tag and each other tag associated with the artifact, wherein determining the measure of value comprises increasing the measure of value of the selected tag and the other tags associated with the artifact in response to the selection of the artifact; and
- computer-usable program code that outputs a list comprising at least the selected tag and an indication of the measure of value of the selected tag;
- wherein the computer-usable program code that monitors user interaction comprises computer-usable program code that subscribes a user of the collaborative tagging system to a designated tag to provide to the user information about the designated tag as the tag evolves within the collaborative tagging system, wherein
- the computer-usable program code that determines a measure of value further comprises computer-usable program code that calculates the measure of value according to a frequency of user interaction with the tag, and
- the computer-readable device is not a transitory, propagating signal per se.

8. The computer program product of claim 7, wherein the selected tag is identified by search results comprising at least the selected tag.

9. The computer program product of claim 7 wherein the list comprises each of the plurality of tags associated with the artifact.

* * * * *